US005150134A

United States Patent [19]

Hansen et al.

[11] Patent Number: 5,150,134

[45] Date of Patent: Sep. 22, 1992

[54] COUNTER ELECTRODE FOR AN ELECTROSTATIC RECORDER

[75] Inventors: Lorin K. Hansen, Fremont; Stephen D. White, Santa Clara, both of Calif.

[73] Assignee: Xerox Corporation, Stamford, Conn.

[21] Appl. No.: 706,708

[22] Filed: May 29, 1991

[51] Int. Cl.[5] .............. G01D 15/06

[52] U.S. Cl. .............. 346/155

[58] Field of Search .............. 346/154, 155

[56] References Cited

U.S. PATENT DOCUMENTS

| | | | |
|---|---|---|---|
| 4,163,980 | 8/1979 | Angelbeck et al. | 346/155 |
| 4,180,824 | 12/1979 | Yvard et al. | 346/154 |
| 4,400,709 | 8/1983 | de Kermadec et al. | 346/154 |
| 4,427,988 | 1/1984 | de Kermadec et al. | 346/155 |
| 4,607,269 | 8/1986 | Playe | 346/155 |
| 4,806,957 | 2/1989 | Beegan | 346/155 |
| 4,977,416 | 12/1990 | Bibl et al. | 346/155 |

*Primary Examiner*—George H. Miller, Jr.

[57] ABSTRACT

An electrostatic recorder for applying electrical charges, in image configuration, upon a movable image recording member, the recorder including a stylus electrode array and a counter electrode array which electrode arrays are aligned with one another on opposite surfaces of the image recording member and are positioned so as to extend across the direction of movement of the image recording member. The counter electrode array comprises a base member supporting a plurality of electrically conductive traces thereon, each extending substantially in the direction of movement of the recording member. The conductive traces are interconnected by a layer of resistive material, and contact pads are connected to periodically spaced conductive traces so as to apply electrical potentials to spaced regions of the counter electrode array. Those conductive traces located intermediate the periodically spaced conductive traces are electrically floating when electrical potentials are applied to the spaced conductive traces.

19 Claims, 9 Drawing Sheets

COUNTER ELECTRODE FOR AN ELECTROSTATIC RECORDER

FIELD OF THE INVENTION

This invention relates to electrostatic recorders employing a charging path between recording electrodes and counter electrodes between which a recording medium travels and, more particularly, to an improved continuous backplate electrode structure with improved addressing and wear characteristics.

BACKGROUND OF THE INVENTION

Electrostatic printing upon an image recording medium comprises the formation of a latent, electrostatic image by the creation of air ions and the deposition of those of a given sign (usually negative) at selected image pixel locations on the recording medium. Subsequently, the electrostatic latent image is made visible by "toning", which usually involves the passing of the recording medium, bearing the latent (non-visible) image, into contact with a liquid solution containing positively charged dye particles in a colloidal suspension. The dye particles will be attracted to the negative charge pattern and the density of the dyed image will be an increasing function of the potential or charge on the recording medium.

Two types of image recording media in common usage are paper and film. The paper has a conductive bulk and a thin dielectric coating upon its image bearing side. The film comprises a dielectric substrate (such as Mylar®), a very thin intermediate conductive layer and a dielectric overcoat layer upon its image bearing side. Conductive edge stripes passing through a dielectric surface layer to the conductive layer provide electrical paths to the conductive layer. In the case of paper, the writing potential established in the conductive layer is obtained by contact, i.e. by a combination of resistive and capacitive coupling, and in the case of film, the potential established in the conductive layer is obtained by capacitive coupling through the dielectric substrate.

Conventionally, an electrostatic image may be formed upon a recording medium, such as paper, having a thin surface dielectric layer coated upon a conductive base material. The recording medium is passed between a recording head, including an array of recording stylus electrodes, and a counter electrode comprising an array of complementary backplate electrode segments. A charge is applied to the recording medium through a pair of coincident voltage pulses applied to opposite surfaces of the medium by the stylus electrodes and the backplate electrodes. When the potential difference between the stylus electrodes and the recording medium conductive layer rises enough to cause the voltage in the air gap therebetween to exceed the breakdown threshold of the air, the air gap becomes ionized and air ions of the opposite sign to the potential of the conductive layer are attracted to the surface of the dielectric layer. As the dielectric surface charges up, there is a corresponding drop in voltage across the gap, so that when the voltage across the gap drops below the maintenance voltage of the discharge, the discharge extinguishes, leaving the dielectric surface charged. The discharge potential of several hundred volts may be established by applying a voltage of a first polarity, e.g. on the order of −300 volts, to the stylus electrodes contemporaneously with the application of a substantially equal voltage of the opposite polarity, e.g. +300 volts, to the backplate electrodes. This causes the electrical discharge, imposing a localized negative charge to the surface of the dielectric layer of the recording medium.

Electrostatic recorders may be typically from 11 inches to 44 inches wide, and in some cases even as wide as 72 inches. Therefore, the writing head stylus array which extends fully across this width may have as many as 2000 to over 17,000 styli (at resolutions of 200 to 400 dots per inch). Because of this very large number of styli it is ordinarily not economically attractive to use a single driver per stylus, and a multiplexing arrangement is commonly used in conjunction with the above-described electrostatic discharge method. The styli in the writing head array are divided into stylus electrode groups (each group being about 0.5 inch to 1.5 inches long) so that each may consist of several hundred styli. Then the stylus electrodes are wired in parallel so that corresponding styli in each group, or every other group, are connected to a single driver and carry the same information. A selected stylus group writes only when its complementary electrode is pulsed.

In U.S. Pat. No. 4,424,522 (Lloyd et al) entitled "Capacitive Electrostatic Stylus Writing With Counter Electrodes" there is disclosed a counter electrode assembly of the backplate type which is conformable to the arcuate crown of the recording head. A structure of this type is illustrated in FIGS. 1, and is more fully described below. It comprises a plurality of parallel laminated segments of an insulating substrate overcoated with a resistive material, each segment is mounted upon an elongated, U-shaped, support bar so as to be electrically independent. The laminate material is stretched over the mouth of the support bar upon supporting legs and a resilient foam material is introduced into the channel of the support bar for urging the surface resistive material into intimate contact with the recording medium. In its commercial application, in electrostatic printer/plotters manufactured by the assignee of the present patent application, the channel of the support bar is provided with a strip of foam and an oil-filled bladder for urging the segmented backplate electrodes toward the writing head.

Use of the segmented counter electrode structure may result in striations, i.e. visible striping on the printed image extending in the direction of movement of the recording medium. One possible source of counter electrode caused striations is the large voltage gradients induced in the image recording medium between pulsed and non-pulsed electrodes. Another possible source is the gap between backplate electrode segments necessitated by mounting tolerances for preventing electrical shorting. The cutting process by which the segments are formed can also cause problems. When the cut is made with a stamp, die or knife edge, the edges tend to be frayed, resulting in an increased probability of shorting between the segments. When the cut is made by a laser, the melted edge tends to be carbonized and beaded or thickened and, during mounting and alignment of the segments upon the U-shaped, support bar, this carbonized bead can smear on the support bar causing a subsequent shorting path. Still another disadvantage of the segmented backplate electrode structure is that uniform wrapping tension of each segment upon the support bar is difficult to achieve, resulting at times in curling of the segment edges which can allow debris and chaff to collect in the gaps and to provide a shorting path. The non-uniform tension can also result in differing image intensity across the plot and differing wear across the writing head.

It is the primary object of this invention to eliminate the segmentation of the backplate electrodes by forming the backplate electrode as a continuous structure. Another object is to improve the wear characteristics of the backplate electrode structure. A further object is to alter the voltage gradients across the pulsed electrodes and between pulsed and non-pulsed electrodes.

SUMMARY OF THE INVENTION

These and other objects may be obtained, in one form, by providing an improved electrostatic recorder for applying electrical charges, in image configuration, upon a movable image recording member. The recorder includes a stylus electrode array and a novel counter electrode which electrodes are aligned with one another on opposite surfaces of the image recording member and are positioned so as to extend across the direction of movement of the image recording member. The counter electrode comprises a base member supporting a plurality of electrically conductive traces thereon, the traces extending substantially in the direction of movement of the recording member. Resistive material interconnects the conductive traces, and contact pads are connected to periodically spaced conductive node traces for applying electrical potentials to spaced regions of the counter electrode array. The conductive traces located intermediate the spaced conductive node traces are electrically floating when electrical potentials are applied to the spaced conductive node traces.

BRIEF DESCRIPTION OF THE DRAWINGS

Other objects and further features and advantages of this invention will be apparent from the following, more particular, description considered together with the accompanying drawings, wherein.

DETAILED DESCRIPTION OF THE INVENTION

Figure 1:
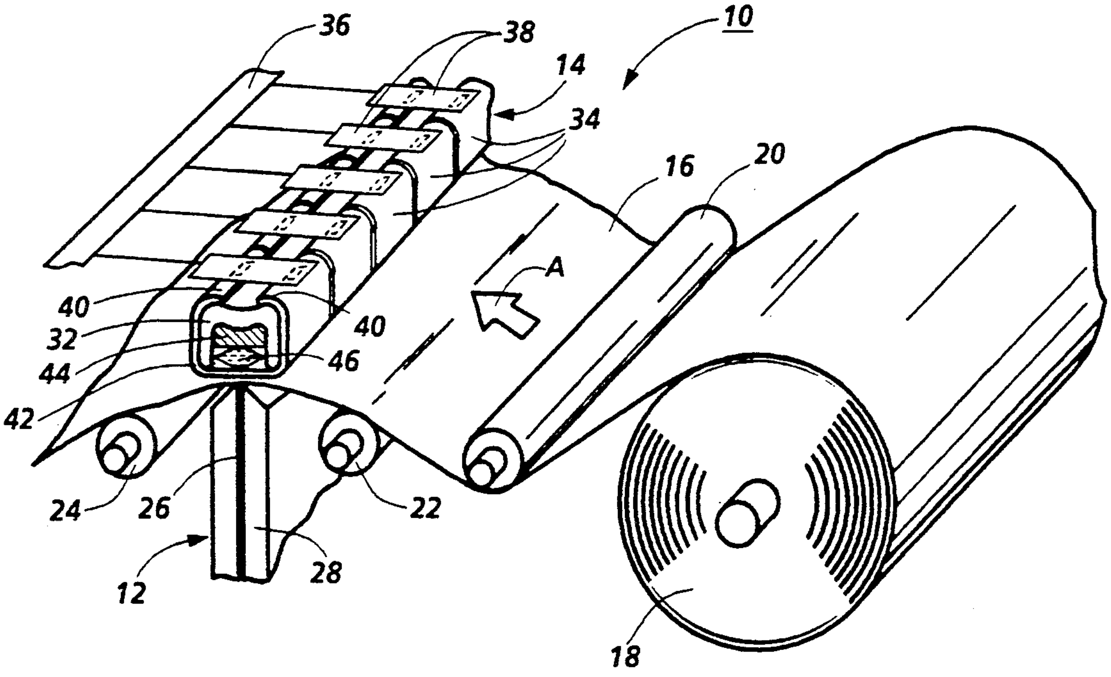
Fig. 1 (Prior Art)
FIG. 1 is a perspective view of a known charging station for an electrostatic recorder having writing styli and backplate electrodes disposed on opposite sides of an image recording medium.

Turning now to the drawings, there is illustrated in FIG. 1 the relevant electrostatic image forming elements of a known electrostatic stylus recorder 10. It includes a writing head 12 and a conformable backplate electrode 14 for depositing a latent electrostatic image on the dielectric surface coating of a web-like image recording medium 16. The recording medium is provided on a supply spool 18 and is advanced in the direction of the arrow A to pass between the writing head 12 and the backplate electrode 14. An appropriate tension force is applied by tensioning roller 20 to ensure that the web 16 is advanced at a controlled rate. Guide rollers 22 and 24 cause the web 16 to wrap over the crown of the writing head 12 at a suitable wrap angle. The writing head 12 comprises a linear array of conductive styli, or nibs, 26 embedded within an insulating support member 28 along a central elongated nib line 30 (indicated by a central phantom line in subsequent Figures). Nib drivers pulse the styli at appropriate voltages in a timed manner, in accordance with the information to be printed. It should be understood that there may be two such linear styli arrays displaced from one another in the direction of web movement, with each of the styli of one array being laterally offset from each of the styli of the other array by one half the inter-styli spacing, in order to obtain full density printing.

The known backplate electrode 12 most commonly comprises an insulating U-shaped support bar 32 upon which are mounted resistive electrode segments 34. The segments are cut from a gauze sheet, made of dacron or other like material, having layers of a carbon loaded polymer mixture pressed into both of its surfaces to form an integral sheet about 5-10 mils thick which is strong, has a lubrous wear resistant surface, and has a resistivity in the range 10-20 kΩ/square. Great care must be taken during mounting to accurately space the segments 34 from one another by a minimal distance (to reduce striations) and yet far enough apart to prevent electrical contact therebetween. Backplate electrode drivers 36 are connected to the electrode segments 32 by contact pads 38 formed on a printed circuit board (not shown) which overlies the support bar 32. The ends 40 of each electrode segment 34 are simultaneously in contact with the contact pad 38 and the central portion 42 of each electrode segment overlies the open mouth of the support bar 32. In this manner the backplate electrode may be in conforming contact with the writing head 12 as the arcuate crown of the writing head penetrates the plane of the open mouth of the support bar. Additional loading and load equalization is achieved by placing a foam strip 44 and an oil bladder 46 into the channel behind the electrode segments.

Figure 2:
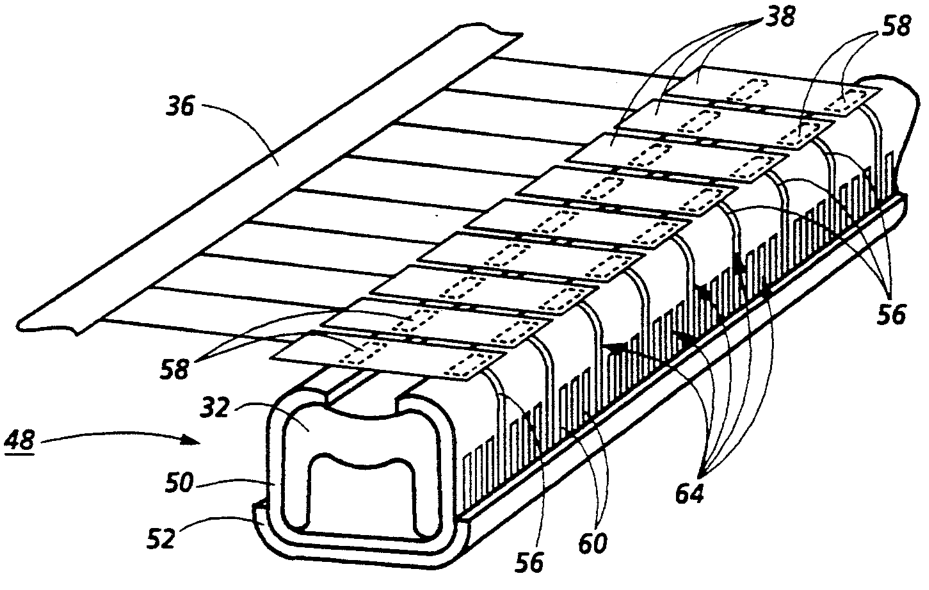
FIG. 2 is a perspective view of one form of the backplate electrode structure of the present invention.
Figure 3:
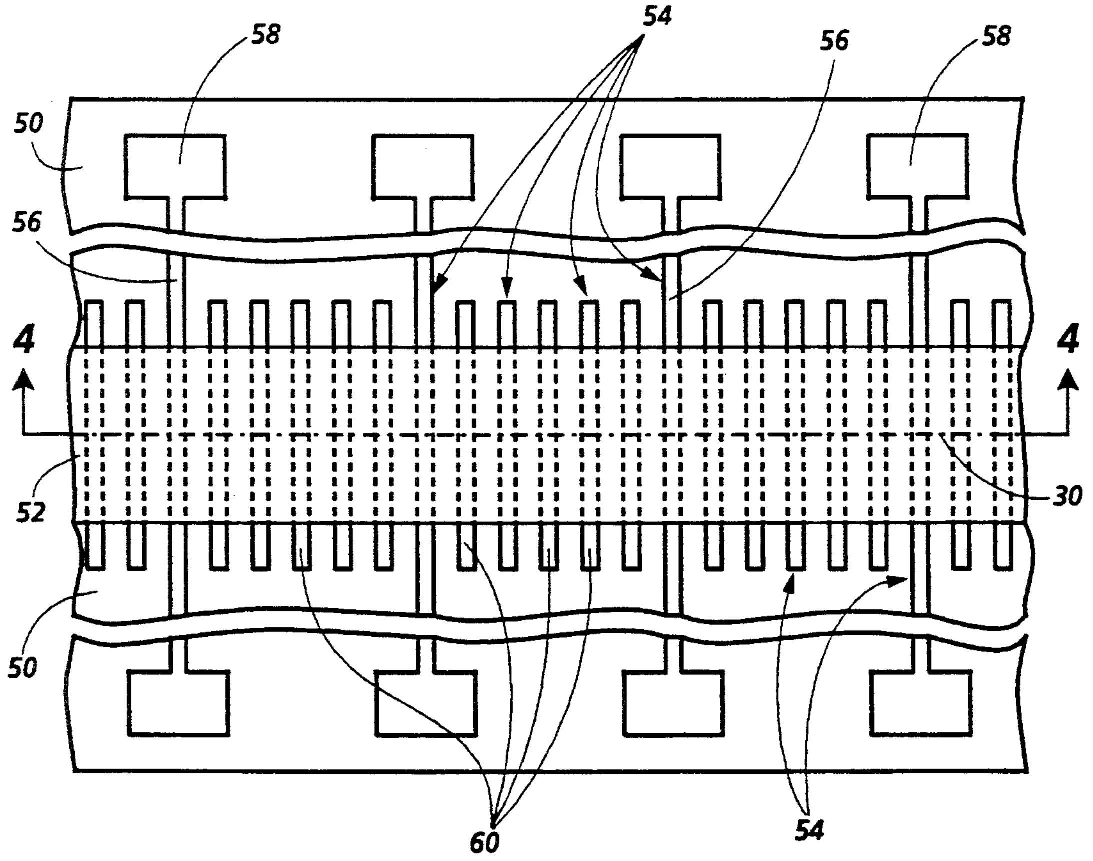
FIG. 3 is a plan view of the backplate electrode support material utilized in the apparatus of FIG. 3 in its unmounted state.
Figure 4:
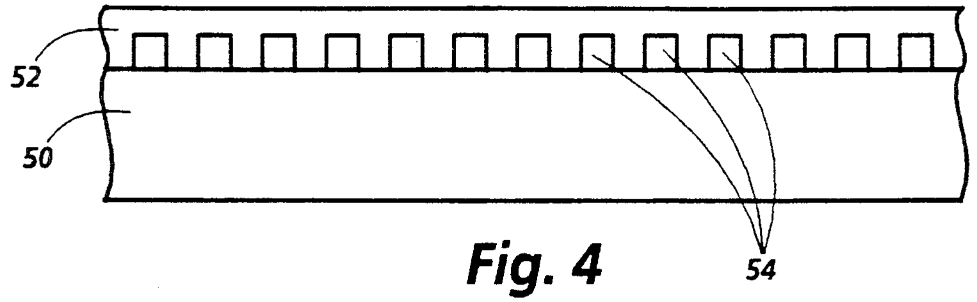
FIG. 4 is a sectional view taken substantially along line 4—4 of FIG. 3.

A backplate electrode 48 according to the present invention is shown in FIG. 2. It is mounted upon an insulating U-shaped support bar 32 and comprises a continuous base insulating layer 50 such as Mylar® or Kapton® about 3-5 mils thick to which is attached, by printing or adhesion, a continuous strip of polymeric resistive material 52, for example, carbon loaded Teflon® about 1-3 mils thick with a resistivity in the range 10-20 kΩ/square. An array of parallel metallic traces 54, made of copper or other highly conductive material, is deposited between the layers 50 and 52 (as shown in FIG. 4) perpendicular to the long dimension of the backplate electrode. Electrical connection to the resistive material 52 is by spaced node traces 56 having outboard contact pad extensions 58 integral therewith, against which printed circuit board contact pads 38 may be urged. Electrically floating traces 60 intermediate the node traces 56 are not connected to an electrical potential source. The traces 54 and 56 may be about 1 to 2 mils thick by 1 to 2 mils wide and spaced about 2 mils apart. Excellent control over the potential gradients may be achieved when traces are employed because there will be a constant potential in sections between traces pulsed positive and a linear gradient to zero potential for the sections that are desired to be non-pulsed.

Figure 5:
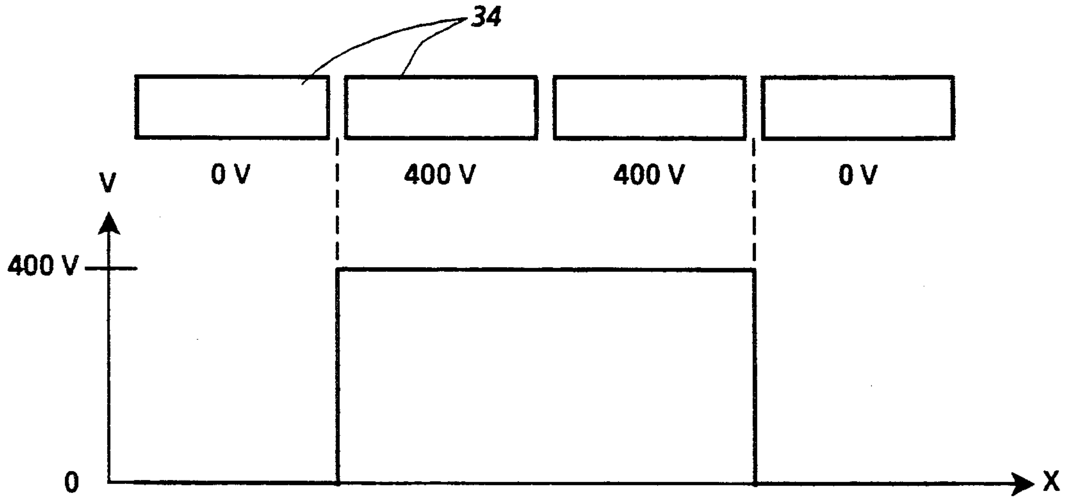
FIG. 5 is a schematic representation of the known backplate electrodes of FIG. 1 and the voltage distribution generated thereby in the image recording medium along the nib line.

In FIG. 5 there is shown a schematic representation of the sharp voltage gradients obtained with the known backplate electrodes of FIG. 1. By comparison, the voltage gradients of the backplate electrodes of the instant invention can be seen to be more gradual in the schematic representations of FIGS. 6 and 7. Furthermore, a distinct advantage of the instant invention is observable in the voltage gradient plot of FIG. 7. Namely, it is possible to pulse portions of the backplate electrode at different potentials so as to correct for striations caused by sequential pulsing of the backplate electrodes. The problem of sequential addressing in the context of a FIG. 1 type apparatus is set forth in co-pending, commonly assigned, patent application U.S. Pat. No. 07/532,467 filed on May 30, 1990 entitled "Electrographic Marking With Modified Addressing To Eliminate Striations". Whenever the potential of a conductive layer of a recording medium is changed by pulsing a pair of backplate electrodes relative to the remaining backplate electrodes, which are maintained at a reference potential, the potential difference will cause current flow through it. When the pulse is extinguished, the current flows back. Perturbations in the recording medium potential distribution are induced, and die out, by the RC time constant associated with these current flows. Subsequent writing on a perturbed region of the recording medium, which perturbation has not dissipated completely, will be affected thereby and will result in visible nonuniformities (striations) in the printed information. Since a region of the backplate electrode is raised to a positive potential by pulsing node traces at the ends of the regions, it is possible to pulse the end traces a different positive potentials so that there is a linear variation from one end of the pulsed region to the other. The present arrangement allows sequential pulsing of the backplate electrodes (thus simplifying addressing) because the potential perturbations in the recording medium may be overcome by tailoring the potential gradient therein.

Figure 8:
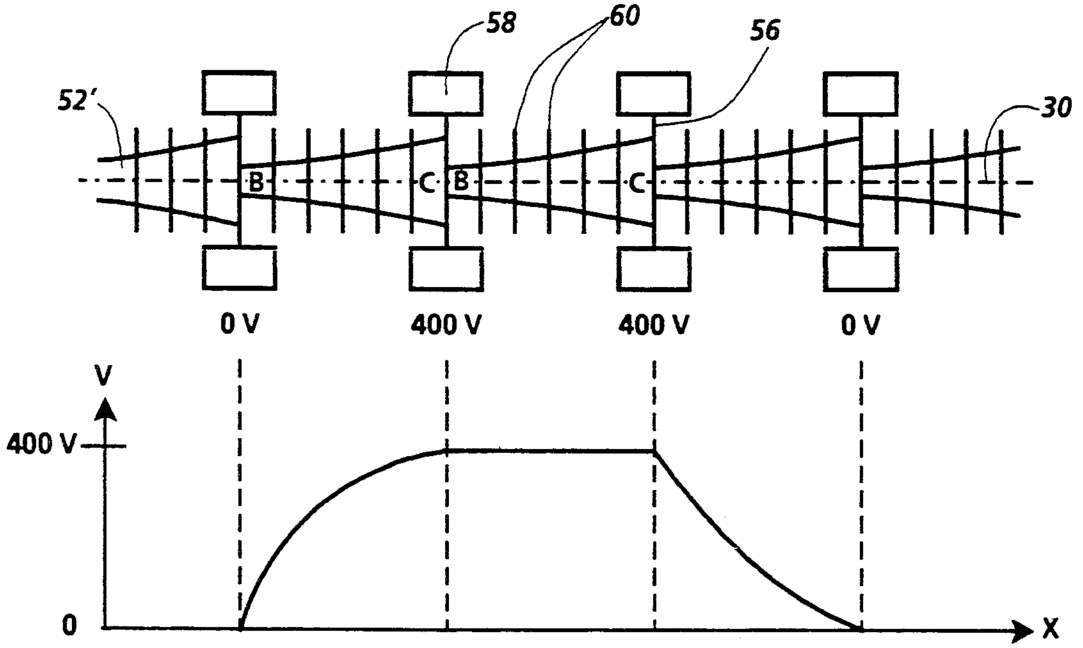
FIG. 8 is a schematic representation of an alternative form of the backplate electrodes of FIG. 2 wherein the resistive material is patterned in order to tailor the voltage gradient response along the nib line.
Figure 9:
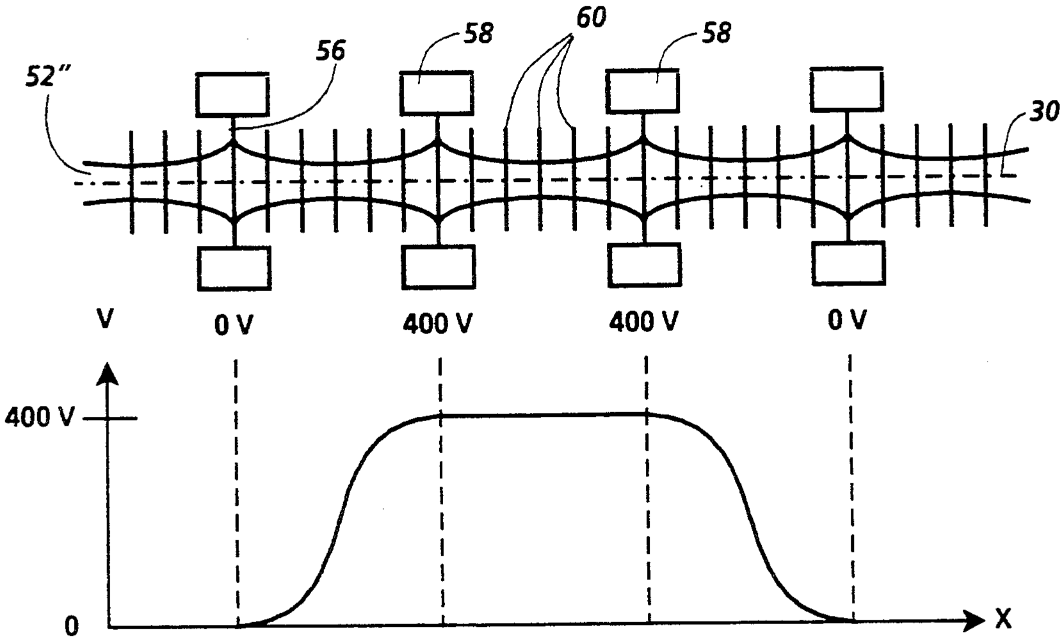
FIG. 9 is a schematic representation of an alternative form of the backplate electrodes of FIG. 2 having a different pattern of the resistive material.

As illustrated in FIGS. 8 and 9, it is also possible to tailor the pattern of the resistive material in order to shape the recording material potential distribution at the nib line. In FIG. 8 the resistive material 52′ is deposited in an asymmetric pattern which results in the voltage drop per unit distance being less at region B than at region C, as can be observed. Similarly, in FIG. 19, a symmetric bow-tie pattern of the resistive material 52″ could yield a potential distribution as shown, i.e. broadening the lateral extent of the imposed potential.

Figure 6:
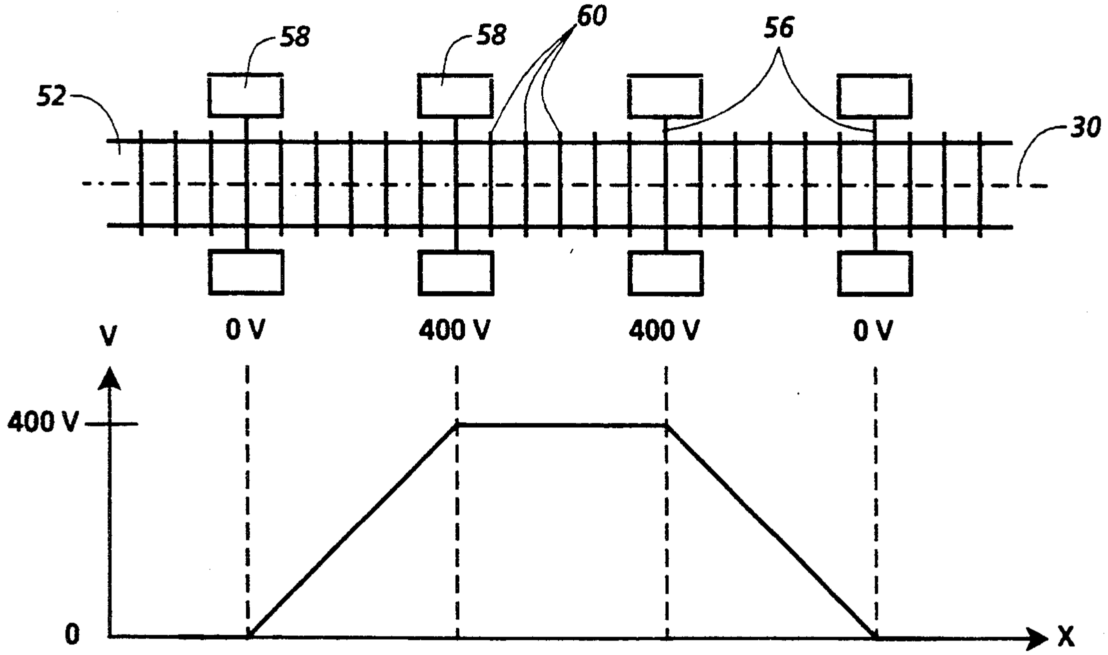
FIG. 6 is a schematic representation of the backplate electrodes of FIG. 2 and the voltage distribution generated thereby in the image recording medium along the nib line.
Figure 7:
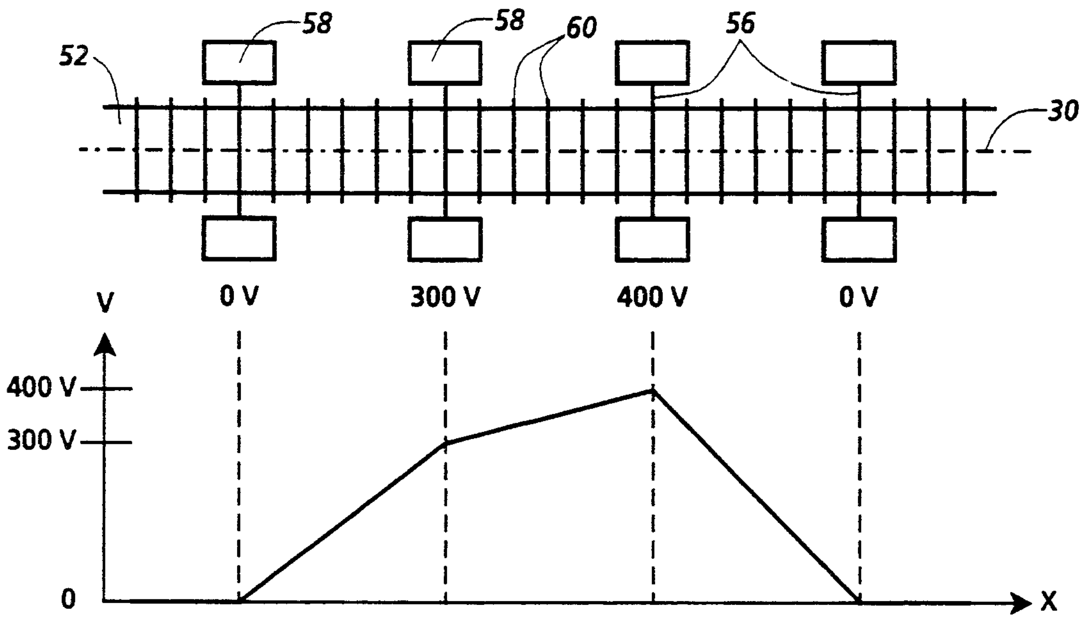
FIG. 7 is a schematic representation of the backplate electrodes of FIG. 2 being pulsed at different voltages and the voltage distribution generated thereby in the image recording medium along the nib line.
Figure 10:
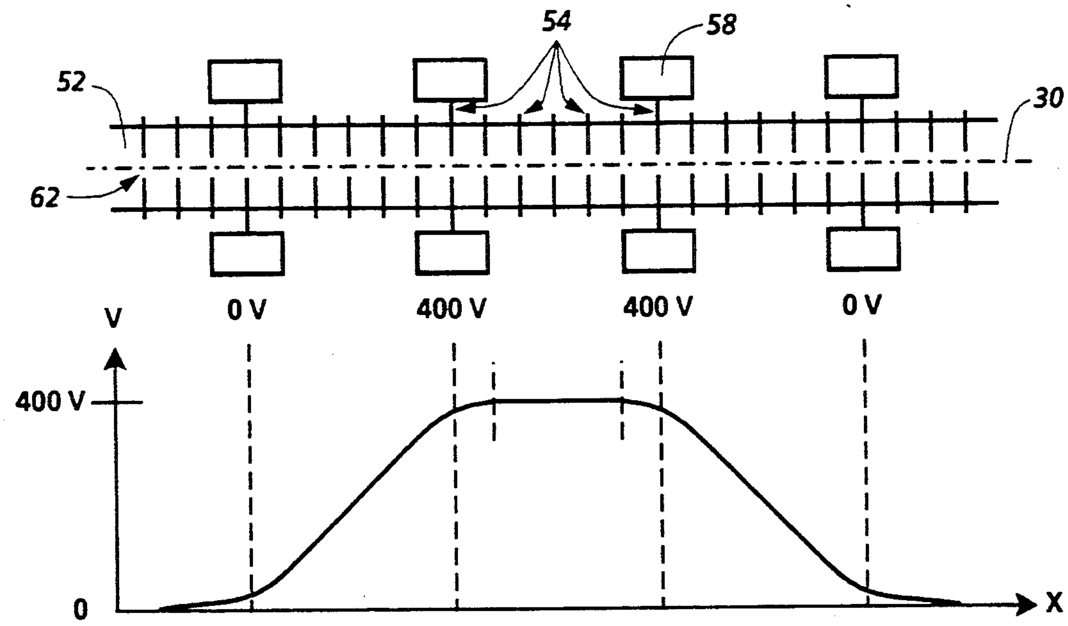
FIG. 10 is a schematic representation of an alternative configuration of the backplate electrodes and the voltage distribution generated thereby in the image recording medium along the nib line.

The metallic traces 54 are provided for two reasons: first to insure potential gradients, through the resistive material 52, along the length of the backplate electrode, and second, to prolong the wear life of the backplate electrode which is subject to abrasion by the paper surface of the recording medium 14. Since the metallic traces are much more resistant to wear than the resistive material, when the resistive material over the traces is totally worn away, the backplate electrode will still be operational because of the presence of resistive material between the traces. However, in the event that pinholes are present in the recording medium, the bare traces may cause adjacent styli, pulsed at different potentials, to short out and to blow their corresponding nib drivers. One way to minimize this occurrence is to form the traces with a narrowed waist overlying the nib line 28 in order to lower the possibility of shorting. This cause of shorting may be eliminated altogether by providing a central gap 62 in all the traces 54, overlying the nib line 28, as illustrated schematically in FIG. 10. If the gap is small, on the order of 3/16 to 5/16 inch, the traces will still operate substantially in their intended manner. A comparison of FIGS. 6 and 10 shows that the difference in the potential distribution along the nib line of the backplate electrode has rounded, rather than sharp transitions when a central gap 62 is present, because of field penetration. This rounding-off of the potential in the recording medium at the edges of the backplate electrode pulsed regions decreases slightly the lateral extent of the uniform potential region.

Figure 11:
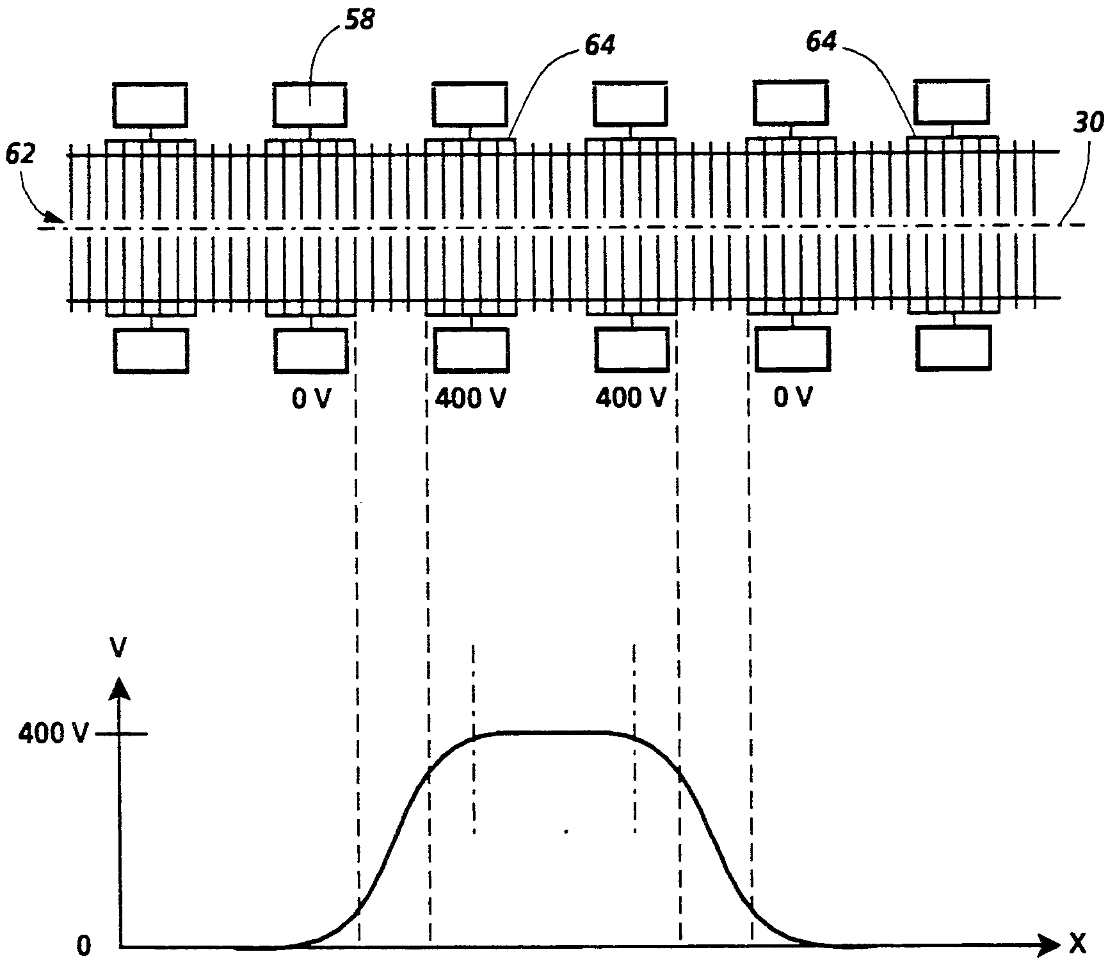
FIG. 11 is a schematic representation of a further configuration of the backplate electrodes and the voltage distribution generated thereby in the image recording medium along the nib line.

The embodiment of FIG. 11 proposes to increase the lateral extent of the region of uniform potential. By connecting each contact pad 50 to a ganged group of parallel traces 64, the transition from an ON pulsed group to an OFF pulsed group will extend from the edge of one ganged group to the edge of the other. The potential gradient will exist over the narrow region subtended by the floating traces and the uniform potential region will extend over the longer distance of the ganged traces, as can be seen in the voltage plot. It is possible to modify this embodiment by eliminating the passive floating electrodes entirely and by extending the traces completely across the gap 62.

Figure 12:
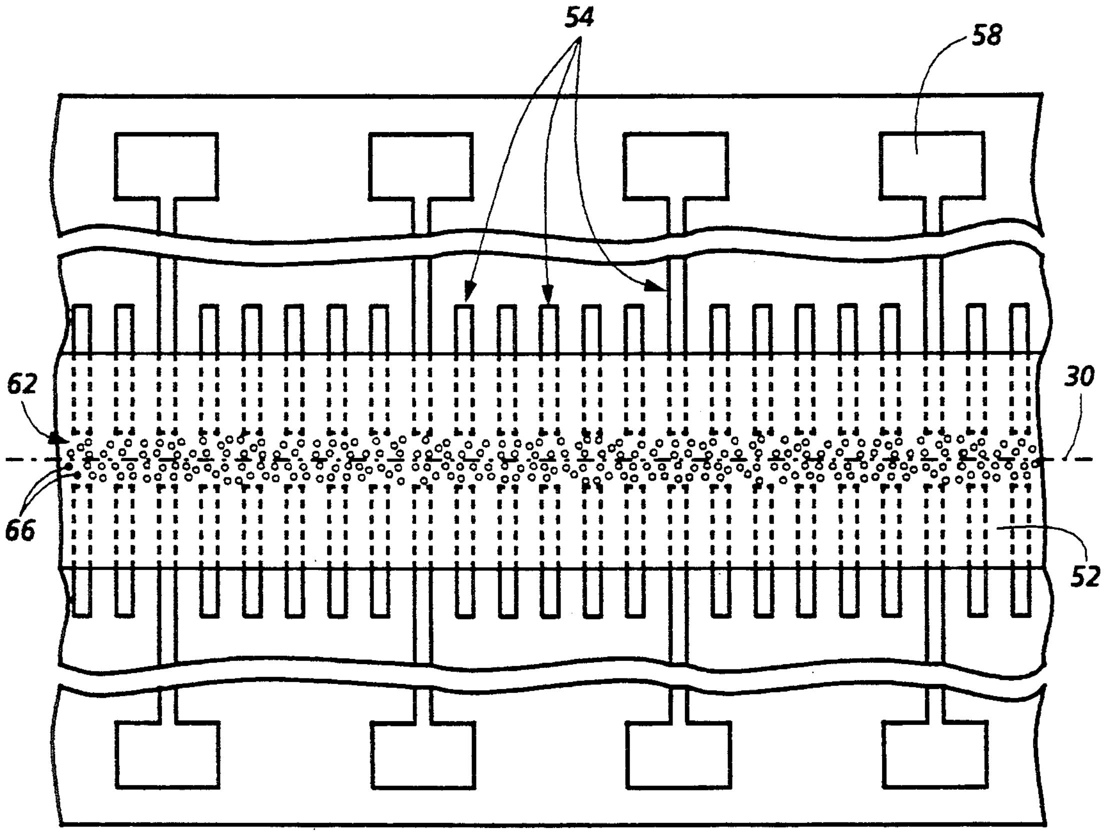
FIG. 12 is a schematic representation of another configuration of the backplate electrodes with improved wear characteristics.

By depositing wear pads 66 throughout the resistive material in the central gap region 62, as shown in FIG. 12, the possibility of shorting out adjacent styli may be eliminated. If the wear pads are in the form of metallic islands deposited simultaneously with the traces, about 1-2 mils in diameter and about 1-2 mils high it is not possible for either styli in offset rows or adjacent styli in a single row to be shorted out. Alternatively, the wear pads may be in the form of wear resistant, electrically conductive or electrically insulating spacers or filler particles. These particles may be made of a material with a conductivity similar to the backplate resistive material, such as silicon carbide in the form of beads, fibers or platelets embedded in the resistive material. Because of the small size and the similar resistivity there will be no shorting problem. Carbide, in the form of beads, fibers or flakes embedded in the resistive material, shorting may be avoided by virtue of the wear pad material.

Figure 13:
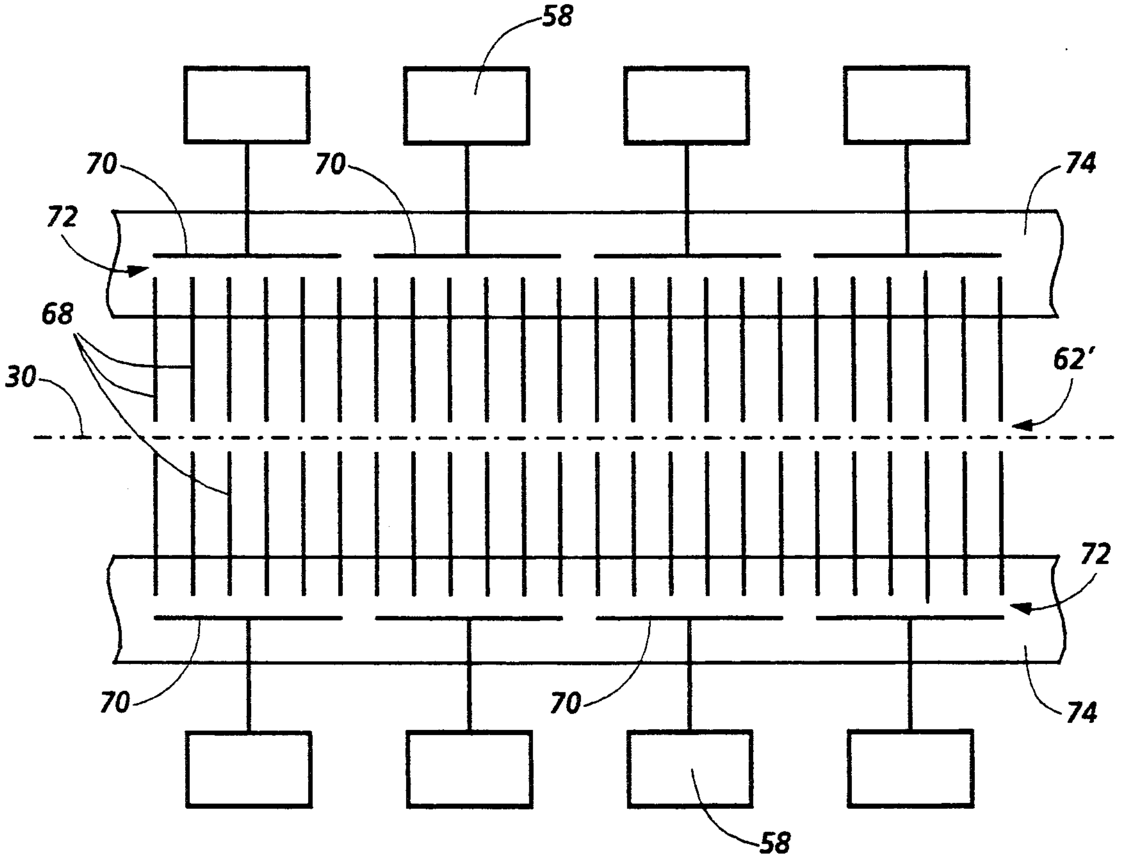
FIG. 13 is a schematic representation of yet another configuration of the backplate electrodes with improved wear characteristics.
Figure 14:
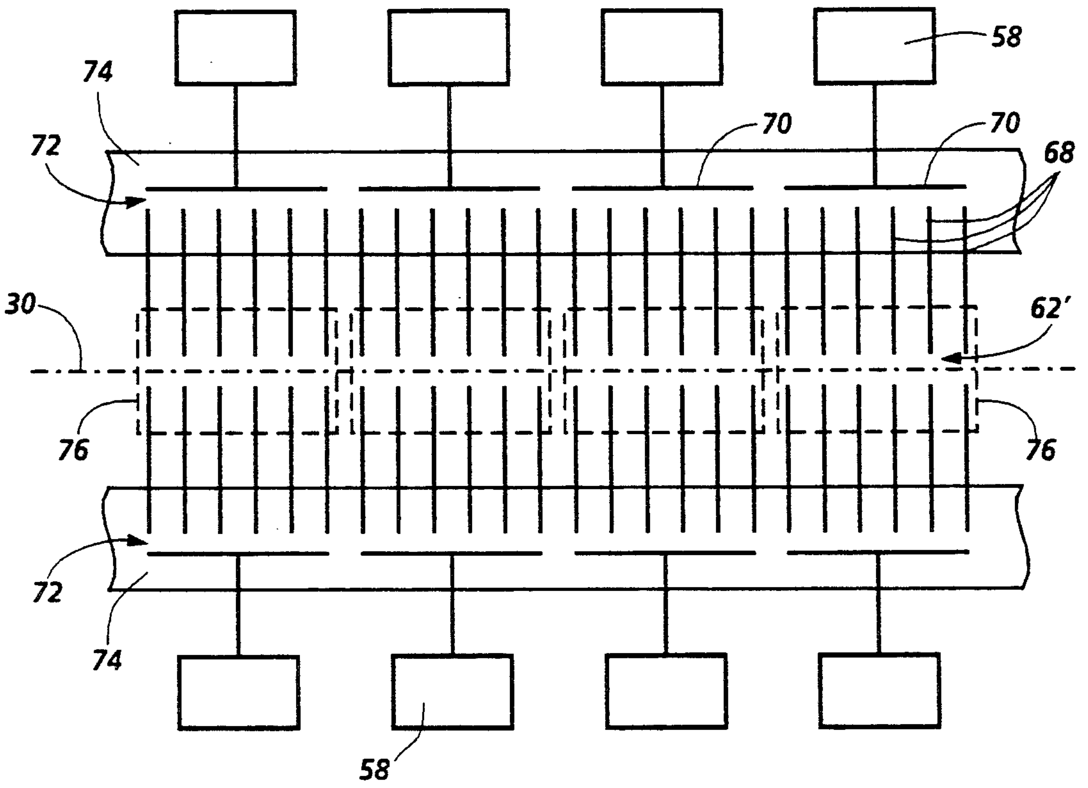
FIG. 14 is a modification of the backplate electrode structure of FIG. 13.
Figure 15:
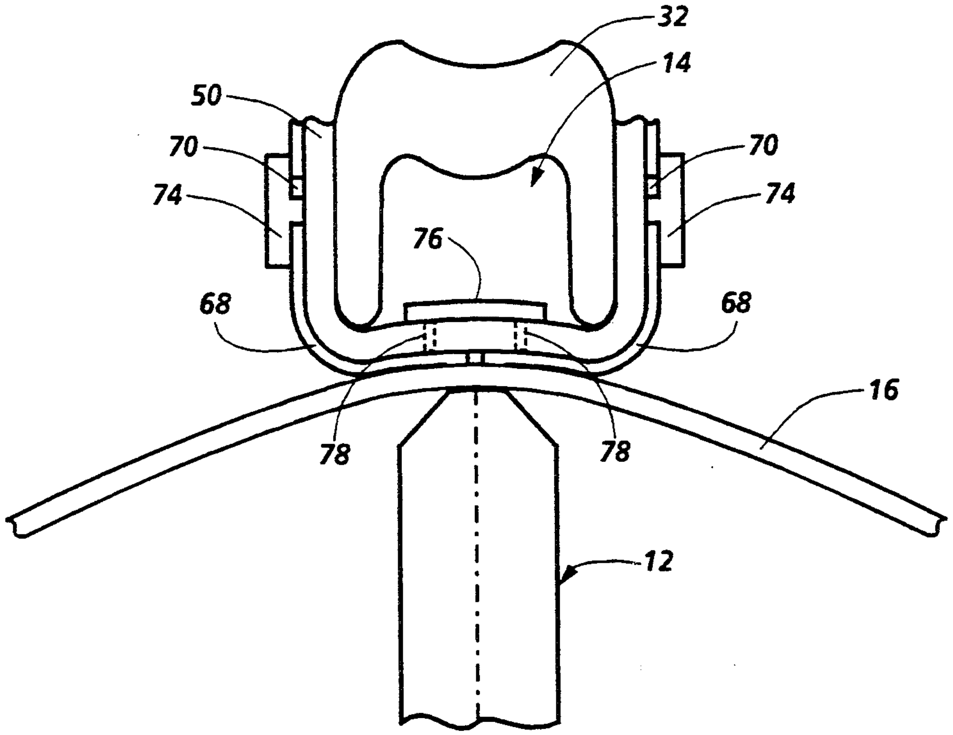
FIG. 15 is a sectional view of the backup electrode structure of FIG. 14.

In the alternative embodiment of FIGS. 13 to 15 the resistive material is eliminated completely from the region of the central gap 62' between the traces. By decreasing the gap size to about ⅛ inch or somewhat less, the conductivity of the paper itself is utilized, in lieu of the resistive material, to equalize the potential along the nib line 30. However, when the gap is this narrow, the backup electrode must be aligned to relatively close tolerances, and it is possible for two or more of the traces in a ganged group to create a short between an ON stylus and an OFF stylus through pinholes in the paper, thereby blowing the stylus drivers. The stylus drivers may be protected by limiting the current that can flow between the "shorted" styli. This can be accomplished by spacing the ganged traces 68 from the ganging Tee or bus 70 by a narrow gap 72 and completing the electrical connection, between the traces and the bus, by means of a thin layer of resistive material 74.

When film is used with the embodiment of FIG. 13, capacitive coupling thereto over the nib line cannot be accurately controlled since there are no traces nor resistive material opposite to the styli. To overcome this problem, the arrangement of FIGS. 14 and 15 is suggested, as a universal solution, since it may be used for both paper and film. A number of highly conductive metallic pads 76, each coextensive with a single ganged trace group, are deposited on the rear surface of the insulating substrate 50 of the backup electrode, directly over the nib line 30. The pads 76 may be connected to their respective traces via performations 78 through the substrate, or they may be capacitively coupled to the traces if the overlap therebetween is sufficiently extensive.

It should be understood that numerous changes in details of construction and the combination and arrangement of elements and materials may be resorted to without departing from the true spirit and scope of the invention as hereinafter claimed.

What is claimed:

1. An electrostatic recorder for applying electrical charges in image configuration upon a movable image recording member, said recorder including a stylus electrode array and a counter electrode array, said electrode arrays being aligned with one another on opposite surfaces of said image recording member and being positioned so as to extend across the direction of movement of said image recording member, and said counter electrode array comprises a base member comprising an electrically insulating film, a plurality of electrically conductive traces extending substantially in said direction of movement supported on said base member, resistive means interconnecting said conductive traces, and means for applying electrical potentials to periodically spaced conductive traces.

2. The electrostatic recorder as defined in claim 1 wherein conductive traces intermediate said periodically spaced conductive traces are electrically floating when electrical potentials are applied to said periodically spaced conductive traces.

3. The electrostatic recorder as defined in claim 1 wherein said resistive means comprises a layer of resistive material disposed over a region of said conductive traces positioned in opposition to said stylus electrode array.

4. The electrostatic recorder as defined in claim 3 wherein said layer of resistive material is patterned in order to tailor the potential distribution in the recording material along said stylus electrode array.

5. The electrostatic recorder as defined in claim 1 wherein said conductive traces extend across said stylus electrode array.

6. The electrostatic recorder as defined in claim 1 wherein said conductive traces are interrupted so as to provide a gap therein in substantial alignment with said stylus electrode array.

7. The electrostatic recorder as defined in claim 6 wherein wear pads are located in said resistive material within said gap.

8. The electrostatic recorder as defined in claim 6 wherein said wear pads comprise islands of conductive material.

9. The electrostatic recorder as defined in claim 6 wherein said wear pads comprise islands of insulating material.

10. The electrostatic recorder as defined in claim 1 wherein said periodically spaced conductive traces to which electrical potentials are applied comprise a group of conductive traces.

11. The electrostatic recorder as defined in claim 10 wherein said conductive traces extend across said stylus electrode array.

12. The electrostatic recorder as defined in claim 10 wherein said conductive traces are interrupted so as to provide a gap therein in substantial alignment with said stylus electrode array.

13. The electrostatic recorder as defined in claim 12 wherein wear pads are located in said resistive material within said gap.

14. The electrostatic recorder as defined in claim 13 wherein said wear pads comprise islands of conductive material.

15. The electrostatic recorder as defined in claim 13 wherein said wear pads comprise islands of insulating material.

16. The electrostatic recorder as defined in claim 15 including a bus to which said group of electrical traces is electrically connected but is physically separated therefrom, and wherein said layer of resistive material is disposed over said region of physical separation.

17. The electrostatic recorder as defined in claim 16 wherein said groups of conductive traces are supported on one surface of said base member and conductive pads associated with, and electrically connected to, each of said groups are supported on the opposite surface of said base member at a location so as to extend across said stylus electrode array.

18. The electrostatic recorder as defined in claim 17 wherein each of said conductive pads is capacitively coupled to its associated group of conductive traces.

19. The electrostatic recorder as defined in claim 17 wherein each of said conductive pads is directly connected to its associated group of conductive traces through said base member.

* * * * *